United States Patent [19]

Kalwara et al.

[11] Patent Number: 5,409,987
[45] Date of Patent: Apr. 25, 1995

[54] POLYCHLOROPRENE AND POLYMONOOLEFIN RUBBER ADHESIVE COMPOSITION

[75] Inventors: Joseph J. Kalwara, Indianapolis; William B. Gorman, Mooresville; Chester T. Chmiel, Granger, all of Ind.

[73] Assignee: Bridgestone/Firestone, Inc., Akron, Ohio

[21] Appl. No.: 191,229

[22] Filed: Feb. 3, 1994

[51] Int. Cl.$^6$ .............................................. C08L 11/00
[52] U.S. Cl. ................... 524/519; 524/365; 525/215
[58] Field of Search ................. 524/519, 365; 525/215

[56] References Cited

U.S. PATENT DOCUMENTS

| | | |
|---|---|---|
| 3,317,441 | 5/1967 | Baudin . |
| 3,351,572 | 11/1967 | Jameson . |
| 3,364,155 | 1/1968 | Souffie . |
| 3,488,315 | 1/1970 | Stucker et al. . |
| 3,645,934 | 2/1972 | Caywood . |
| 3,689,441 | 9/1972 | Hori et al. . |
| 3,878,153 | 4/1975 | Driscoll . |
| 3,965,055 | 6/1976 | Shichman et al. . |
| 4,100,123 | 7/1978 | Westermann . |
| 4,431,775 | 2/1984 | Maeda et al. . |
| 4,587,302 | 5/1986 | Berta . |
| 4,607,074 | 8/1986 | Hazelton et al. . |
| 4,737,528 | 4/1988 | Musch et al. . |
| 4,839,428 | 6/1989 | Davis . |
| 4,851,468 | 7/1989 | Hazelton et al. . |
| 4,994,519 | 2/1991 | Scheer . |
| 5,151,467 | 9/1992 | White . |
| 5,281,651 | 1/1994 | Arjunan et al. . |

FOREIGN PATENT DOCUMENTS 60-181180  9/1985  Japan .

*Primary Examiner*—Carman J. Seccuro, Jr.
*Attorney, Agent, or Firm*—Frank J. Troy, Sr.

[57] ABSTRACT

A flowable adhesive composition specifically adapted for use in securing rubber sheet material to a substrate surface includes at least one polychloroprene rubber polymer, at least one polymer or copolymer which is comprised primarily of one .or more monoolefins, and a suitable solvent for simultaneously dissolving the polychloroprene and monoolefin based rubbers to form a homogeneous composition which can be applied to the substrate surface and rubber sheet as by pouring, brushing, spraying, rolling, or similar operations.

The composition comprises a blend containing at least one polychloroprene rubber and at least one monoolefin based polymeric elastomer. The rubber adhesive composition of the invention exhibits good initial bond strength and excellent resistance to creep, while simultaneously demonstrating the ability to retain good adhesive properties upon repeated exposure to moisture.

10 Claims, No Drawings

POLYCHLOROPRENE AND POLYMONOOLEFIN RUBBER ADHESIVE COMPOSITION

FIELD OF INVENTION

The invention relates to a rubber-based, flowable adhesive composition, and more particularly to a rubber-based flowable adhesive composition for use in connection with membrane roofing material such as EPDM (ethylene propylene diene terpolymer).

BACKGROUND

Polychloroprene was the first synthetic elastomer used in rubber-based adhesives. It is still the most commonly used elastomer in a variety of adhesive compositions because of its ability to achieve rapid bond strength development with good tack or auto-adhesion, and because of its resistance to degradation by oils, chemicals, heat, sunlight and ozone.

In particular, conventional bonding adhesives used to adhere single-ply roofing membranes to various substrates generally utilize a polychloroprene polymer or a blend of different polychloroprene polymers as the sole elastomeric ingredient. Polychloroprene-based adhesives, despite certain disadvantages, are used extensively in the roofing industry because of their excellent initial bond strength and resistance to creep. Specifically, polychloroprene adhesives impart relatively low peel values and are susceptible to damage and loss of bond strength from extensive wet and dry cycles.

In a typical roof top environment there is a chance that the adhesive used for bonding roofing membranes to a roof substrate will be inadvertently exposed to moisture. Cuts in EPDM membrane, improper seam fabrication, and loose perimeter attachments of membrane to parapets are some sources of intrusion of moisture under the membrane. Typically, polychloroprene can withstand these moisture intrusions, but if allowed to be exposed to repeated wetting and drying conditions, polychloroprene adhesives will begin to lose their bond strength to the EPDM membrane and eventually separate therefrom.

Butyl rubber-based adhesive compositions have been used in connection with membrane roofing materials such as EPDM and neoprene for forming solid tapes or flowable adhesives which are used for sealing the joints between overlapping edges of roofing membranes. Butyl rubbers are known to impart high adhesion values and to be resistant to degradation upon exposure to moisture. Butyl rubbers, however, have not generally been used in flowable adhesive formulations for bonding roofing members to roof substrates, presumably because of their lower initial bond strength and because of their lower resistance to creep, as compared to polychloroprenes.

SUMMARY OF THE INVENTION

The invention is directed toward a flowable adhesive composition which exhibits the outstanding initial bond strength and creep resistance indicative of conventional polychloroprene-based adhesives while overcoming the disadvantages of relatively low adhesive strength and susceptibility to moisture degradation characteristics of the polychloroprene adhesives, when exposed to repeated wetting and drying conditions.

The flowable adhesive composition of the invention includes a blend of at least one polychloroprene and at least one elastomeric polymer which is comprised primarily of a monoolefin based polymer dissolved in a solvent system. The solvent vaporizes upon application of the adhesive composition to a roof substrate and exposure to the ambient atmosphere leaving a residue which forms a tacky gel or semi-solid adhesive coating suitable for bonding a roofing membrane to the roof substrate.

The blend has been found to have improved properties relative to the individual elastomeric components of which it is comprised. Specifically, it has been unexpectedly discovered that, by blending a monoolefin based rubber with a polychloroprene rubber it is possible to provide an adhesive formulation which exhibits increased peel strength and moisture resistance while retaining good initial bond strength.

Surprisingly it has also been discovered that the addition of small amounts of monoolefin based polymer to a polychloroprene adhesive composition provides for unexpected, non-incremental improvements in auto-adhesion, shear strength and resistance to creep.

DETAILED DESCRIPTION OF THE INVENTION

The flowable adhesive formulation of the invention generally comprises one or more primarily monoolefin based rubber polymers and one or more polychloroprene rubber polymers which are dissolved together in a suitable solvent. The adhesive compositions of the invention can generally include a suitable cure system, tackifier resins, antidegradants such as antioxidants and other conventional additives as desired.

The polychloroprene polymers which can be used in the practice of the invention generally include homopolymers and various copolymers of chloroprene (2-chloro-1,3-butadiene) which exhibit elastomeric or rubber-like properties. Suitable chloroprene copolymers can generally contain up to about 20 percent, preferably between 1 percent and 10 percent, by weight of various monomers which are copolymerizable with chloroprene, including, for example, a diene or halogenated diene such as 1-chlorobutadiene or 2,3-dichlorobutadiene; a vinyl-substituted aromatic such as styrene, or alphamethyl styrene; a diolefin such as isoprene; or an acrylic monomer such as acrylonitrile, methacrylonitrile, and the like.

Polychloroprene homopolymers and copolymers are generally prepared by emulsion polymerization techniques which are well known in the art. Suitable polychloroprenes are commercially available from E. I. du Pont de Nemours & Company, Distugil S. A., Denka Chemical Corporation, and others.

The monoolefin based polymers of the invention are generally comprised of at least 80 percent, and more preferably at least 85 or 100 percent, by weight of one or more monoolefin monomer units.

Suitable monoolefin rubber polymers which can be used in the practice of the invention include homopolymers and copolymers composed primarily of one or more monoolefin monomers, optionally comprising minor amounts of one or more open-chain conjugated diolefin monomers, and optionally containing one or more vinyl-substituted aromatic monomers, as well as halogenated derivatives and analogues thereof. Examples of suitable monoolefins include those containing from 4 to 7 carbon atoms such as isobutylene, 1-butene, 2-butene, 2-methyl pentene, 4-methyl-2-pentene, and the like, with isobutylene being highly preferred. The open-chain conjugated diolefins which can be used to form suitable butyl rubber polymers in the practice of the invention include those having from 4 to 8 carbon atoms such as isoprene, 1,3-butadiene, 1,2-dimethyl-1,3-butadiene, 1,3-pentadiene (piperylene), 2,3-dimethyl-1,3-butadiene, 3-methyl-1,3-pentadiene, 1,3-dimethyl-1,3-butadiene, 1-ethyl-1,3-butadiene, and the like.

Examples of optional vinyl-substituted aromatic monomers which can be copolymerized with monoolefins and conjugated diolefin monomers to form the monoolefin based rubber polymers suitable for use in the practice of the invention include those having from 8 to about 12 carbon atoms including styrene, alpha-methyl styrene, para-methyl styrene and the like.

Other monoolefin rubber polymers suitable for use in the practice of the invention include halogenated analogues of the aforementioned rubber polymers, particularly chlorinated and brominated butyl rubber polymers. The preferred butyl rubber polymers for use with the invention are those wherein the open-chain conjugated diolefin monomer or monomers comprise from about 0.5 percent by weight to about 5 percent by weight of the butyl rubber polymer.

The optional vinyl-substituted aromatic monomer or monomers, when used, comprise from about 5 percent by weight to about 10 percent by weight of the monoolefin based rubber polymer, and the balance of the polymer is substantially comprised of at least one monoolefin monomer.

Chlorinated butyl rubber polymers which can be used generally contain from 1.0 percent by weight to 1.5 percent by weight of chlorine, and brominated butyl rubber polymers which can be used generally contain from 2.0 percent by weight to about 2.5 percent by weight of bromine. Particularly preferred butyl rubber polymers for use in the practice of the invention include copolymers of isobutylene and isoprene containing from about 0.5 to about 4 percent isoprene by weight, isobutylene homopolymer, copolymers of isobutylene and p-methyl styrene containing from about 5 percent to about 10 percent p-methyl styrene by weight, halogenated copolymers of isobutylene and isoprene, with brominated copolymers thereof containing from about 2 percent to about 2.5 percent bromine by weight being more preferred. Other monoolefin based polymeric rubbers which can be used include copolymers of isobutylene, p-methyl styrene and brominated p-methyl styrene which contain from about 5 percent to about 10 percent p-methyl styrene and halogenated p-methyl styrene by weight, and from about 0.5 percent to about 2 percent bromine by weight.

Various monoolefin based rubber polymers suitable for use with the invention are commercially available. Particularly preferred commercially available isomonoolefin based rubbers include "Polysar BBX2," a bromobutyl rubber available from Polysar Rubber Company, Sarnia, Ontario, Canada, and "Bromo XP-50," a brominated isobutylene/p-methylstyrene copolymer containing about 10 percent p-methyl styrene by weight and about 2 percent bromine by weight, available from Exxon Chemical Company, an affiliate of Exxon Corporation.

Commercially available butyl rubbers and other monoolefin based rubbers are generally prepared in a slurry process using methyl chloride as a vehicle and a Friedel-Crafts catalyst as the polymerization initiator. The polymerization is generally at a temperature of from about −90° C. to about −100° C. These and other methods of preparing monoolefin based rubber polymers are well known to the art.

The amount of polychloroprene polymer used in the adhesive composition of the invention generally ranges from about 50 percent to about 98 percent by weight, and more preferably from about 50 percent to about 90 percent by weight, based on the total weight of the polychloroprene polymer and monoolefin based rubber polymer used.

In accordance with the principles of the invention, wherein a flowable adhesive composition having increased bonding and better resistance to moisture-induced degradation is provided, at least one polychloroprene polymer and at least one monoolefin based rubber polymer are dissolved in a solution containing a solvent or mixture of solvents which are capable of simultaneously dissolving both of the polymers to form a flowable homogenous composition which can be applied to a substrate as by pouring, brushing, spraying, rolling or similar operations or combinations thereof.

In addition to being capable of dissolving each of the polymers of the adhesive composition, the solvent should be capable of rapidly vaporizing at or near normal atmospheric pressures and typical outdoor temperatures, and should be substantially non-reactive with the rubber polymers and any other ingredients used in the composition such as tackifiers, curatives and other additives. Examples of suitable solvents include various aliphatic and cycloaliphatic compounds containing from about 6 to 12 carbon atoms such as n-hexane, n-heptane, n-octane, cyclohexane, and the like; aromatic hydrocarbons containing from about 7 to about 10 carbon atoms such as toluene, xylenes and the like; and ketones contains from 3 to about 6 carbon atoms such as acetone, methyl-ethyl ketone and the like.

The amount of solvent used is generally determined based upon the solubility of the particular polymers used with the selected solvent or solvents, and on the desired flow characteristics of the adhesive composition. The minimum amount of solvent used is generally the amount needed to completely dissolve the polymeric constituents of the composition and to keep them in solution at the temperatures generally encountered during transportation and storage of the adhesive prior to use. Typically, from about 2 parts by weight to about 10 parts by weight, and more preferably from about 4 parts by weight to about 6 parts by weight, of solvent are used per part by weight of the total amount of chloroprene polymer and butyl or other monoolefin rubber polymer used.

The adhesive composition of the invention can generally include conventional amounts of various additives typically used in adhesive compositions including tackifiers, antioxidants, and the like.

The adhesive composition of the invention can be used for bonding a variety of materials, but are particularly well suited for bonding rubber sheet materials such as EPDM roofing membranes to various roofing substrates such as sheet metal, concrete, etc. The adhesive compositions can be utilized in a conventional manner to secure rubber sheet roofing membranes to a roofing substrate, typically by first applying the adhesive to the roof substrate and to the rubber sheet, then allowing a sufficient quantity of the solvent in the adhesive composite to vaporize so that the applied adhesive has desirable tackiness, then positioning the adhesive coated rubber sheet roofing membranes over the roofing substrate to which adhesive composition has been applied, and thereafter applying suitable pressure to secure the rubber sheet roofing membrane to the roofing substrate.

The invention can be understood more fully by reference to the following illustrative examples.

EXAMPLE 1 (CONTROL)

This example illustrates the adhesion level generated by the industrial standard polychloroprene based adhesive such as Uniroyal M6504 or Carlisle 90-8-30A. Test samples were prepared by lightly removing any loose dusting agent or dirt from the surface of 0.045 inch thick EPDM, and applying a known amount of adhesive, equivalent to 45 to 60 square feet per gallon which is typically applied in roofing applications, with a brush to a 3″×6″ surface of EPDM and also to a rigid aluminum panel. The surfaces were allowed to dry for 15 minutes and were mated. A 15-lb. roller was then used to complete the lamination.

Peel adhesion values were obtained after the prescribed aging period by attaching the aluminum panel and the EPDM from the same end of the sample between the jaws of a tensile tester and pulling them apart at a rate of two inches per minute. The force is continued until the sample has been peeled completely apart. The peel strength is the average force applied to the sample during the peeling process. The results are expressed in pounds per lineal inch (pli).

The above-described tests may be carried out by those skilled in the art and the results of such test may be used to compare the formulations and aging thereof.

TABLE I

| | Peel Adhesion (pli) @ 70° F. | |
|---|---|---|
| Aging Conditions | Uniroyal M6504 | Carlisle 90-8-30A |
| 24 Hours @ 70° F. | 1.7 pli | 0.8 pli |

EXAMPLE 2

This example illustrates the improved adhesion level of adding a isomonoolefin based polymer. Used in this example is a bromobutyl rubber ("Polysar BBX2", from Polysar Rubber Company, Sarnia, Ontario, Canada), which is incorporated up to 40 parts per hundred parts rubber (phr).

Specimens for peel adhesion testing were prepared in accordance with the following formulae:

| | Formula (phr) | | | |
|---|---|---|---|---|
| Ingredients | A | B | c | D |
| Solvents | 505.9 | 505.9 | 505.9 | 505.2 |
| Polychloroprenes | 90.0 | 79.9 | 70.0 | 59.8 |
| Polysar BBX2 | 10.0 | 20.1 | 30.0 | 40.2 |
| Resins | 54.6 | 54.6 | 54.6 | 54.6 |
| Mgo | 5.5 | 5.5 | 5.5 | 5.5 |
| ZnO | 2.0 | 2.0 | 2.0 | 2.0 |
| Antioxidant | 1.1 | 1.1 | 1.1 | 1.1 |
| Water | 0.8 | 0.8 | 0.8 | 0.8 |
| Total Weight: | 669.9 | 669.9 | 669.9 | 669.2 |
| Total Solids: | 24.3% | 24.4% | 24.4% | 24.4% |

The 24-hour peel adhesion values for the formulae illustrated above were determined under the conditions described in Example I and are as follows:

TABLE II

| | Peel Adhesion (pli) @ 70° F. | | | |
|---|---|---|---|---|
| | Formula | | | |
| Aging Conditions | A | B | C | D |
| 24 Hours @ 70° F. | 2.6 | 2.7 | 2.8 | 2.3 |

It is seen by comparing this data with that shown in Table I, that incorporation of butyl polymer (Polysar BBX2) increases the adhesion value up to 40 phr of butyl polymer.

EXAMPLE 3

This example illustrates the inclusion of "Exxon Bromo XP-50" brominated isobutylene-p-methylstyrene copolymer, containing 10% p-methyl styrene and 2% bromine by weight. In this example, the isomonoolefin based polymer was incorporated up to 50 phr. Specimens for peel adhesion testing were prepared in accordance with the following formulae:

TABLE III

| | Formula (phr) | | | | |
|---|---|---|---|---|---|
| Ingredients | A | B | C | D | E |
| Solvents | 505.9 | 505.9 | 505.9 | 505.2 | 504.5 |
| Polychloroprenes | 90.0 | 79.9 | 69.9 | 59.8 | 49.7 |
| Exxon Bromo XP-50 | 10.0 | 20.1 | 30.1 | 40.2 | 50.3 |
| Resins | 54.6 | 54.6 | 54.6 | 54.6 | 54.6 |
| MgO | 5.5 | 5.5 | 5.5 | 5.5 | 5.5 |
| ZnO | 2.0 | 2.0 | 2.0 | 2.0 | 2.0 |
| Antioxidants | 1.1 | 1.1 | 1.1 | 1.1 | 1.1 |
| Water | 0.8 | 0.8 | 0.8 | 0.8 | 0.8 |
| Total Weight | 669.9 | 669.9 | 669.9 | 669.2 | 668.5 |
| Total Solids (%) | 24.4 | 24.4 | 24.4 | 24.4 | 24.4 |

The 24-hour peel adhesion values for these formulae were determined under the conditions described in Example I and are as follows:

TABLE IV

| | Peel Adhesion (pli) @ 70° F. | | | | |
|---|---|---|---|---|---|
| | Formula | | | | |
| Aging Conditions | A | B | C | D | E |
| 24 Hours @ 70° F. | 3.5 | 3.9 | 4.4 | 3.4 | 2.9 |

It is seen by comparing this data with that in Table I, that incorporation of "Exxon Bromo XP-50" increases the peel adhesion value up to 50 phr of bromo XP50.

EXAMPLE 4

Similarly, the blending of an all polychloroprene adhesive with an adhesive containing only butyl polymer results in increased adhesion values over those obtained with only the polychloroprene adhesive. The data provided in this example is from test samples prepared similarly to those in Example 1. Adhesives used are commercially available through Uniroyal Adhesives and Sealants Company. The polychloroprene adhesive used was M6504, and the butyl adhesive used was M6524.

TABLE V

| | Peel Adhesion (pli) @ 70° F. | | | |
|---|---|---|---|---|
| Aging Conditions | M6504 | 10% Butyl | 20% Butyl | 30% Butyl |
| 24 Hours @ 70° F. | 1.7 pli | 2.6 pli | 2.9 pli | 2.8 pli |

EXAMPLE 5

This example shows how the addition of butyl rubber at various levels improves moisture resistance when compared to a purely polychloroprene-based adhesive. The samples prepared in Example 2 were used in this example. The test procedure used was RMA test PR-10, 1989, issued by the Rubber Manufacturer's Association but modified to include an exposure at 80° C. and 97% relative humidity for 72 hours, replacing immersion in water at 80° C. for 72 hours. The test calls for preparation of one-inch samples of hexane-cleaned EPDM bonded to EPDM, aged at room temperature for seven days, then subjected to a weathering cycle. This weathering cycle includes 24 hours at 80° C.; 72 hours at 80° C. and 97% relative humidity; 8 hours at −18° C. followed by 64 hours at 80° C. and 97% relative humidity. The samples are then tested for peel strength after completing four cycles or 28 days of exposure. Table VI represents a comparison of peel values before and after weathering. It also demonstrates what is common for polychloroprene adhesives, which is to lose some of their initial bond strength even with aging at room temperature due presumably to crystallization or changes in orientation at the interface. This example shows the extent of bond reduction due to simulated weathering and the effect butyl polymer has on minimizing this loss.

TABLE VI

| AGING: | BEFORE WEATHERING | | | AFTER WEATHERING | |
|---|---|---|---|---|---|
| | 24 hrs (pli) | 7 day (pli) | % Retained Strength | pli | % Retained Strength |
| M6504 | 1.6 | 0.8 | 50% | 0.5 | 31% |
| 90% polychloroprene/10% BBX2 | 2.6 | 1.8 | 69% | 1.0 | 38% |
| 80% polychloroprene/20% BBX2 | 2.7 | 1.9 | 70% | 1.8 | 67% |
| 70% polychloroprene/30% BBX2 | 2.8 | 2.0 | 71% | 2.1 | 75% |

TABLE VII

| | BEFORE WEATHERING | AFTER WEATHERING | |
|---|---|---|---|
| | 24 hr (pli) | pli | % Retained Strength |
| M6504 | 1.6 | 0.5 | 31% |
| 90% M6504/10% M6524 | 2.6 | 0.9 | 35% |
| 80% M6504/20% M6524 | 2.9 | 1.2 | 41% |
| 70% M6504/30% M6524 | 2.8 | 1.6 | 57% |

EXAMPLE 6

In this example, samples prepared in Example 4 were subjected to the moisture resistance test described in Example 5. Table VII shows data for the blends of M6504 and M6524 exposed to the moisture resistance test. The Table shows that the incorporation of a butyl polymer in a polychloroprene based adhesive improves the retention of bond strength when the adhesive is exposed to weathering conditions.

EXAMPLE 7

Polychloroprene adhesives are known to have good initial tack or auto-adhesion. Butyl and other monoolefin based rubber adhesives typically require some period of time before their bond strength matches that of polychloroprenes. Table VIII demonstrates a test of tack or auto-adhesion where a 3-inch by 6-inch sample of 0.045 inch thick EPDM is coated with adhesive, allowed to dry for 60 minutes prior to being folded over on itself to form the mating bond. The sample is then rolled with a 15-pound roller as described earlier. Due to the stresses in the immediate area of the fold, there is a tendency for an adhesive with weak initial tack to separate into a loop at the adhesive interface.

TABLE VIII

| Adhesive | Separation Distance |
|---|---|
| 100% Polychloroprene | 5 mm |
| 100% Butyl Adhesive | 12 mm |
| 90% Polychloroprene/10% Butyl | 3 mm |
| 80% Polychloroprene/20% Butyl | 3 mm |
| 70% Polychloroprene/30% Butyl | 4 mm |
| 60% Polychloroprene/40% Butyl | 8 mm |

From this example it is shown that small additions of monoolefin based polymer can remarkably improve auto adhesion. Likewise, Table IX shows a significant improvement in shear strength or resistance to creep.

In the shear strength test, samples of EPDM coated with adhesive are mated such that the contact area measures 1 inch squared. The samples are pulled on a tensile tester in a shear mode.

TABLE IX

| ADHESIVE | SHEAR VALUE (psi) |
|---|---|
| 100% Polychloroprene | 21.5 |
| 100% Butyl Adhesive | 16.0 |
| 90% Polychloroprene/10% Butyl | 23.8 |
| 80% Polychloroprene/20% Butyl | 24.5 |
| 70% Polychloroprene/30% Butyl | 22.7 |
| 60% Polychloroprene/40% Butyl | 23.9 |

Table IX demonstrates how small amounts of butyl rubber can increase shear strength.

While in accordance with the patent statutes the best mode and preferred embodiment has been set forth, the scope of the invention is not limited thereto, but rather by the scope of the attached claims.

What is claimed is:

1. A flowable tacky contact adhesive composition, consisting essentially of:

at least one polychloroprene polymer, from about 2 parts by weight to about 50 parts by weight of at least one monoolefin based rubber polymer which does not contain diolefin monomer per 100 parts by weight of the total amount of polychloroprene and monoolefin based polymers contained in said composition, a tackifier, and a solvent capable of dissolving said polychloroprene and monoolefin based rubber polymers, said monoolefin based rubber polymer being selected from the group consisting of a homopolymer or copolymer of one or more monoolefins having from 4 to 7 carbon atoms, a halogenated homopolymer or copolymer of one or more monoolefins having from 4 to 7 carbon atoms, a copolymer of one or more monoolefins having from 4 to 7 carbon atoms and one or more vinyl substituted aromatic monomers or halogenated vinyl substituted aromatic monomers, and a halogenated copolymer of one or more monoolefins having from 4 to 7 carbon atoms and one or more vinyl substituted aromatic monomers.

2. A flowable adhesive composition as set forth in claim 1, wherein the polychloroprene polymer is substantially a homopolymer of 2-chloro-1, 3-butadiene, or a copolymer containing at least 80 percent 2-chloro-1, 3-butadiene by weight and up to 20 percent, by weight, of a diene or halogenated diene, a vinyl-substituted aromatic, a monoolefin, an acrylic, or combinations thereof.

3. A flowable adhesive composition as set forth in claim 1, wherein the monoolefin based rubber polymer is a homopolymer of a monoolefin; a copolymer of a monoolefin and a vinyl-substituted aromatic; a halogenated homopolymer of a monoolefin; or a halogenated copolymer of a monoolefin and a vinyl-substituted aromatic.

4. A flowable adhesive composition as set forth in claim 1, wherein the monoolefin based rubber polymer is an isobutylene homopolymer; a copolymer of isobutylene and p-methyl styrene containing from about 5 percent to about 10 percent p-methyl styrene by weight; a terpolymer of isobutylene, p-methyl styrene and halogenated p-methyl styrene containing from about 5 percent to about 10 percent p-methyl and halogenated p-methyl styrene by weight, and containing from about 0.5 percent to about 2 percent bromine by weight; a homopolymer of 1-butene or 2butene; or a copolymer of 1-butene and 2-butene.

5. A flowable adhesive composition as set forth in claim 1, wherein the solvent is an aliphatic or cycloaliphatic hydrocarbon containing from about 6 to about 12 carbon atoms, an aromatic hydrocarbon containing from about 7 to about 10 carbon atoms, a ketone containing from 3 to about 6 carbon atoms, or a mixture thereof.

6. A flowable adhesive composition as set forth in claim 1, wherein the amount of solvent in which the polychloroprene polymer and the monoolefin based polymer are dissolved is in the range of from about 2 parts by weight to about 10 parts by weight for every one part by weight of the total amount of chloroprene polymer and monoolefin based polymer.

7. A flowable tacky contact adhesive composition consisting essentially of:
 a polychloroprene polymer;
 a total of from about 2 to about 50 parts by weight of a monoolefin based rubber polymer which does not contain diolefin monomer for every 100 parts by weight of the total amount said polychloroprene and said monoolefin based rubber polymers, said monoolefin based rubber polymer being selected from the group consisting of a homopolymer or copolymer of one or more monoolefins having from 4 to 7 carbon atoms, a halogenated homopolymer or copolymer of one or more monoolefins having from 4 to 7 carbon atoms, a copolymer of one or more monoolefins having from 4 to 7 carbon atoms and one or more vinyl substituted aromatic monomers or halogenated vinyl substituted aromatic monomers, and a halogenated copolymer of one or more monoolefins having from 4 to 7 carbon atoms and one or more vinyl substituted aromatic monomers;
 a tackifier; and
 a total of from about 200 to about 1000 parts by weight of solvent for every 100 parts by weight of the total amount of said polychloroprene and said monoolefin based rubber polymers, said solvent being capable of dissolving said polychloroprene and said monoolefin based rubber polymers.

8. A flowable adhesive composition as set forth in claim 7, wherein the polychloroprene polymer is substantially a homopolymer of 2-chloro-1, 3-butadiene, or a copolymer containing at least 80 percent 2-chloro-1, 3-butadiene by weight and up to 20 percent, by weight, of a diene or halogenated diene, a vinyl-substituted aromatic, a monoolefin, an acrylic, or combinations thereof.

9. A flowable adhesive composition as set forth in claim 7, wherein the monoolefin based rubber polymer is an isobutylene homopolymer; a copolymer of isobutylene and a p-methyl styrene containing from about 5 percent to about 10 percent p-methyl styrene by weight; or a copolymer of isobutylene, p-methyl styrene and halogenated p-methyl styrene containing from about 5 percent to about 10 percent p-methyl and halogenated p-methyl styrene by weight, and containing from about 0.5 percent to about 2 percent bromine by weight; a homopolymer of a 1-butene or 2-butene; or copolymer of 1-butene and 2-butene.

10. A flowable adhesive composition as set forth in claim 7, wherein the solvent is an aliphatic or cycloaliphatic hydrocarbon containing from about 6 to about 12 carbon atoms, an aromatic hydrocarbon containing from about 7 to about 10 carbon atoms, a ketone containing from 3 to about 6 carbon atoms, or a mixture thereof.

* * * * *